United States Patent

[11] 3,582,570

[72] Inventors Stanton H. Cushner
Los Angeles;
Alfred M. Nelson, Redondo Beach, both of, Calif.
[21] Appl. No. 675,266
[22] Filed Sept. 5, 1967
[45] Patented June 1, 1971
[73] Assignee The Magnovox Company
Torrance, Calif.
Continuation-in-part of application Ser. No. 600,587, Dec. 9, 1966, now abandoned.

[54] THERMOMAGNETIC TRANSDUCING SYSTEM
8 Claims, 12 Drawing Figs.

[52] U.S. Cl. .......... 179/100.2, 340/174.1, 346/74
[51] Int. Cl. .......... G11b 5/02, G01d 15/12, H01v 3/04
[50] Field of Search .......... 179/100.2 (CRT; 340/174.1 (MO); 346/74 (M T)

[56] References Cited
UNITED STATES PATENTS

| | | | |
|---|---|---|---|
| 2,857,458 | 10/1958 | Sziklai | 346/74 |
| 2,915,594 | 12/1959 | Burns, Jr. et al. | 346/74 |
| 3,164,816 | 1/1965 | Chang et al. | 346/74 |
| 3,453,646 | 7/1969 | Speliotis et al. | 346/74 |

*Primary Examiner*—Russell Goudeau
*Attorney*—Smyth, Roston and Pavitt

ABSTRACT: A thin layer of a low Curie point material, such as chromium dioxide, is heated by a focused radiation beam, traveling across the layer. The beam may erase previous magnetization. Preferably a weak, differently oriented magnetic field of below-room temperature coercivity is applied to affect the regions reverting to the ferromagnetic state. An information signal, such as TV signals, is applied to the beam or the weak magnetic field for modulation thereof. In a specific construction the thin layer is magneto optically read from the other side.

INVENTORS:
STANTON H. CUSHNER
ALFRED M. NELSON

By Smyth, Roston & Pavitt

ATTORNEYS

INVENTORS:
STANTON H. CUSHNER
ALFRED M. NELSON

By Smyth, Roston & Pavitt
ATTORNEYS

THERMOMAGNETIC TRANSDUCING SYSTEM

The present application is a continuation-in-part of application Ser. No. 600,587 filed Dec. 9, 1966 now abandoned.

The present invention relates to a new transducing method and system. Magnetic surfaces pertaining to a tape, drum or disc are commonly known storage devices whereby for purposes of recording a transducer is magnetically coupled to the surface, and upon electromagnetic excitation of the transducer, a permanent magnetization is imparted upon the surface of the storage device. One usually speaks here of magnetization of a surface, although more precisely, a region underneath the surface is necessarily included. The same or another transducer is coupled to the magnetized surface for reproducing, often called playback or readout. The permanent magnetization of the carrier magnetizes the reproducing transducer, and by induction an electrical signal develops in the transducer circuit indicative of magnetization.

These commonly known systems have a number of deficiencies which restrict usage thereof. For example, for good magnetic interaction between transducer and the magnetized surface it is necessary that the transducer engages the surface, so that the magnetic field extending between them provides for highest density of flux lines. As the tape moves there is continuous abrasion.

The transducers have usually what is called the transducer gap in between two pole shoes, and it is the function of the storage carrier to magnetically shunt the gap, so that the flux path between the transducer pole shoes has to run through the storage carrier at the gap. For readout, or reproduction, the transducer "sees" the entire permanent magnetization in the particular carrier increment bridging the gap. Hence, variations in the magnetization in this carrier increment are averaged out and will thus not be recognized. This is a material restriction in the information which can be stored reproducibly on a tape, drum, disc, etc. The magnetizable layer itself has a much higher resolution than can be utilized with such transducer readout techniques.

One of the principal advantages of magnetic recording techniques is the possibility of re-using the carrier. Moreover, with precise techniques one could provide for selective erasing, leaving parts of the recording intact while storing new information on the portion which has been cleared. It is obvious that, for such frequent uses, the abrasive action is an ever-increasing detriment.

The invention new provides for a system and method in which magnetism is used only as a basic characteristic phenomenon to store information on a carrier; the information bearing spatial modulation of the magnetization on the carrier results from interaction of the carrier with radiant energy, and the retrieval of the information results from modulation of radiant energy by the magnetism on the carrier; there does not have to be any physical contact with a transducer. The carrier proper has a surface layer of very low Curie point and a low coercive force at temperatures close to the Curie point. Basically, the Curie temperature is a boundary separating the ferromagnetic state of a ferromagnetic material at lower temperatures from the paramagnetic state at higher temperatures. This Curie temperature is different over a wide range for the different materials, normally regarded as being ferromagnetic. For example, ferromagnetic metals mostly have a Curie point of several hundred degrees up to or even above 1000° C. On the other hand, chromium dioxide can be made with a Curie point even below 200° C. Material of such low Curie temperatures will be called thermomagnetic. The Curie point itself is not a sharply defined temperature value, but has only theoretical significance as an exact number on a selected scale. In actuality, the following details are significant.

At room temperature chromium dioxide has a particular hysteresis and a well defined coercivity and remanence, rendering the material usable for permanent magnetization. As the temperature is increased, little changes occur at first in both, in actual residual magnetization due to remanence, and in the configuration of the hysteresis loop as a characteristic feature of the material. As the temperature is increased further, say above 100° C, the hysteresis loop contracts, i.e., the area enveloped by the loop reduces so that the remanence and coercivity become smaller.

The Curie point is regarded as having been reached when the hysteresis loop collapses completely and the material becomes paramagnetic. With regard to an initial remanent magnetization imparted upon the material at room temperature, it is likewise reduced as the Curie point is approached and the magnetization is completely destroyed above the Curie temperature. Two points, however, have to be observed.

As far as the shape of the hysteresis loop is concerned, there is usually complete reversibility of the process unless the loop depends on a particular crystal structure which is destroyed when heating is excessive. For chromium dioxide, this does not present any problem. Thus, as the temperature is decreased again from a high temperature, a small hysteresis loop is set up again when the temperature drops below the Curie point. The loop expands as the temperature drops, and regains its original configuration at temperatures sufficiently below the Curie point. Not so a remanent magnetization; if the material is heated well above the Curie point, the original magnetization is effectively destroyed. When the material is cooled subsequently, it retains no permanent magnetization unless and until subjected again to an external magnetic field of sufficient strength.

If, however, the material is heated only to a temperature about equal to the Curie temperature, possibly somewhat above or below, some of the original magnetization remains, and as the temperature is decreased again, there is some remanent magnetization, though small. If the heating is stopped before the Curie point is reached, and the material is cooled subsequently, a definite remanent magnetization is still present, having a value higher than the remanent magnetization at the temperature of maximum heating, but lower than the remanence at room temperature. If the heating of the material is stopped well below the Curie temperature, the remanent magnetization returns substantially to its original value.

The reason for this behavior is that heating of a material to a temperature not too far below the Curie point weakens the strength of the aligned magnetic dipoles in the material due to increase in the thermal activity in the material. The thermal activity also tends to reduce or even to destroy the magnetic moment of any single magnetic domain. The latter phenomenon is partially reversible and partially irreversible. As long as the elementary dipoles in a magnetic domain retain some overall alignment, and even if one heats rather close to the Curie point, upon cooling the dipoles realign but the available magnetic energy depends on the thermal history of the magnetic domain and is lower the higher the temperature that has been reached. Thus, after cooling, the remanent magnetization of a single magnetic domain may be less than it was before the heating, and the direction of the magnetic moment of the magnetic domain may not agree with the direction before heating. If the Curie point has been reached, the original orientation of the elementary dipoles has been completely destroyed by the thermal movement; upon cooling, the magnetic moments of the several magnetic domains will have, macroscopically, random orientation, so that no or very little macroscopic magnetization can be observed.

In order to provide for any easy distinction, we shall speak merely of remanent magnetization for those cases where a magnetic field has been applied to the material and removed again at room temperature. The same term is used when subsequently the temperature is increased and magnetization is measured at the elevated temperature disregarding any subsequent cooling. Saturation magnetization here is the special case of a magnetization when the strength of the external field sufficed to saturate the material.

We shall speak of thermoremanent magnetization if the previously magnetized material is heated up to a particular temperature and cooled again, to describe the magnetization then remaining after such full thermal treatment. The remanent magnetization (before heating) will be about equal to or larger than thermoremanent magnetization (after cooling) depending upon the maximum temperature reached during heating.

Another aspect of the thermomagnetic material is this. Assume that the material is heated to a temperature at which the hysteresis loop has already contracted in size and to a material extent, but has not collapsed, so that the material has not yet become paramagnetic. Thus, it is assumed that the heating has not reached a temperature at which any remanent magnetization cannot be restored substantially or partially after cooling. During the time the material is at that elevated temperature, a rather weak magnetic field of opposite polarity can be applied. This reversing field further aids in the thermal destruction of the original dipole alignment. It may completely demagnetize the material, or realign the weak dipoles in the opposite direction.

The particular result of the application of this reversing field will depend on the maximum temperature reached and the strength of the reversing field applied at that temperature. The final magnetization will also depend on the fact whether or not this reversing field is retained during cooling. In any event, the magnetic field even if weaker than the coercivity at room temperature, still may suffice to substantially saturate the material when applied at a high temperature, because coercivity at that high temperature is quite low.

A magnetization (i.e. a remanent magnetization) observed after cooling and resulting from the application of a weak magnetic field at high temperature, will be called thermomagnetization, and includes those cases in which the original magnetization (before cooling) is substantially destroyed during heating, or when there was no original magnetization.

In summary, regions in the material subjected to both heating and an externally applied weak reversing field will be remagnetized. Regions subjected only to the reverse field but not to heating will not be demagnetized or remagnetized at all, and the original magnetization remains after the weak reversing field is removed. Regions subjected to heating but not to the reverse field, may after cooling likewise retain their original magnetism, depending upon the maximum temperature reached during heating, i.e., there will be what was defined above thermoremanent magnetization.

The principal aspect of the invention is to be seen in the fact that the magnetic field or fields when and wherever applied are not being applied to restricted areas of the carrier to define the region or area of stored information increments of the smallest order. In the following, we shall use the term information area to describe the area or region on the surface which exhibits particular characteristics (such as magnetization) which differs from the characteristics of its environment, such as nonmagnetization or reversed magnetization or just discernibly weaker magnetization. It is apparent, that the smaller one can make and recognize such information area, the higher is the information density.

In accordance with the invention, such information bearing area or region on a thermomagnetic storage carrier is defined by the focused radiation for providing localized heating, and the degree or extent of localization here determines and the resolution of the information stored. The resolution is given by the smallest meaningful recognizable information area. Since the magnetic field or fields as applied do not have to produce high resolution, no contact with the carrier is needed, and rather large areas of the carrier can and will be magnetized concurrently. The information to be stored will be applied to the radiation beam as modulation thereof. Alternatively the modulation signal can be applied to the magnetic field to be effective only in the small area of storage carrier momentarily intercepted by the radiation beam then being constant. The information to be recorded at any instant will be recorded only at a particular location heated by the radiation beam, and the focusing characteristics of the means concentrating the beam determines the size of the area on the carrier which will then hold the recording of such information.

If the modulation or signal information is used to control the intensity of the radiation beam the recording operates as a selective erasing, but a constant magnetization is preferably applied concurrently as substitution for the erased magnetization but having a direction to oppose the background or original magnetization. This substitution provides for magnetic contrast enhancement and additionally serves to prevent restoration of the original magnetization in the erased regions after cooling. Alternatively the radiation energy beam is kept constant and inscribes, for example, a plurality of parallel tracks on the carrier. Concurrently a magnetic field with below room temperature coercivity amplitude values is applied to the carrier. This magnetic field is also effective only in the region or incremental spot which is temporarily in the paramagnetic state or has a temperature at least close to the Curie point. In this case an initial magnetization does not have to be provided for and the modulation magnetization may vary in any direction. The final magnetization in any spot the tracks which was paramagnetic depends on the particular magnetization imparted upon a paramagnetic spot at the time it reverts to the ferromagnetic state.

For retrieval, the carrier (having cooled) is brought is close proximity to a very thin ferromagnetic layer comprising material having a rather low coercivity. This way, the localized magnetization on the carrier produced localized magnetization in the ferromagnetic layer without requiring intimate contact therewith. A beam of linearly polarized light is directed onto the other side of the very thin ferromagnetic layer. If the magnetization therein is in the plane of incidence, the plane of polarization will be rotated during reflection by an angle in accordance with the localized magnetization of the thin layer, with the direction of rotation depending upon the direction of the magnetization. The individual rays of this polarized beam have their plane of polarization rotated individually, so that a common analyzer placed in the path of the reflected beam will modulate areawise the flux of the beam due to the area-wise modulation-by-rotating-the-plane-of-polarization during reflection.

The invention permits a unique structural combination of recording and reproducing if the thermomagnetic material is likewise a thin layer. Moreover, one can use magnetic storage without mechanical movements or discrete elements. The thermomagnetic material is magnetized as a whole when and however needed. A beam of radiant energy is applied to one side of this thermomagnetic layer for recording in cooperation with a magnetic field (or fields). The thin ferromagnetic layer is on the other side of the thermomagnetic material and may contact the same as there will be no movement between them. A polarized light beam is then applied to the thin layer, and then the reflected beam is analyzed as aforedescribed. This permits readout or reproducing strictly concurrently with the recording for purposes of checking correctness of the recording.

While the specification concludes with claims particularly pointing out and distantly claiming the subject matter which is regarded as the invention, it is believed that the invention, the objects and features of the invention and further objects, features and advantages thereof will be better understood from the following description taken in connection with the accompanying drawing in which:

FIG. 1 illustrates in perspective view but somewhat schematically a recording station in accordance with a first embodiment of the invention;

FIG. **1*a* illustrates schematically recording tracks in region 40 of FIG. 1**;

FIG. **1*b* illustrates the magnetization distribution in region 45 of FIG. 1*a***;

FIGS. **2*a*, 2*b* and 2*c* illustrate characteristics representing the magnetic behavior of the material used as storage carrier in the recording station shown in FIG. 1** and others;

Figure 1:
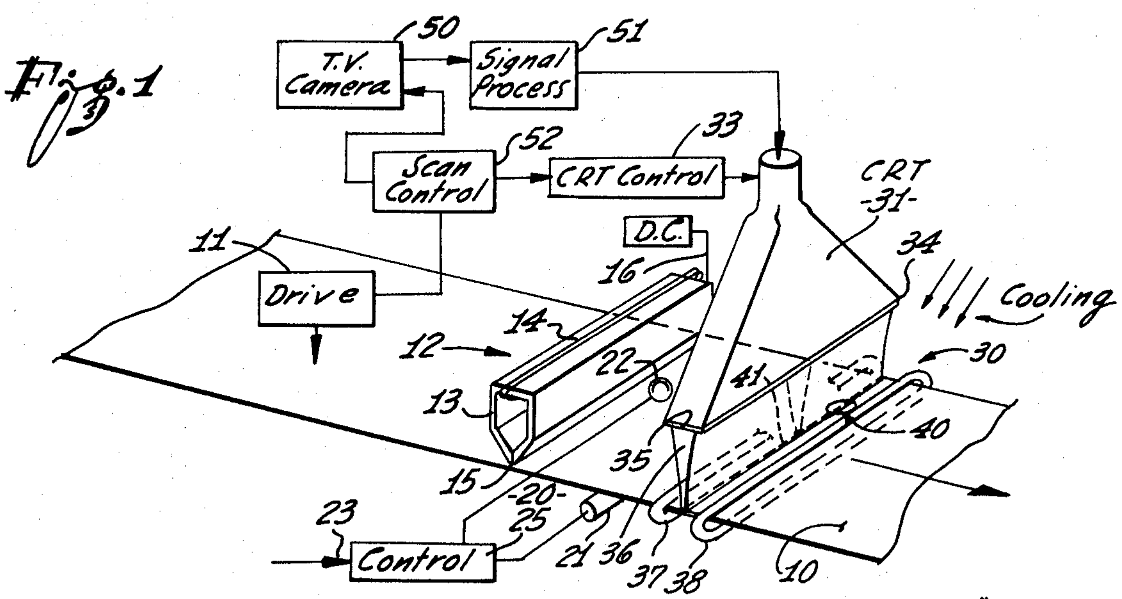

Proceeding now to the detailed description of the drawings, in FIG. 1 thereof is shown a thermomagnetic recording system. The storage element provided for recording is constituted by a storage carrier having at least its surface 10 provided to exhibit thermomagnetic properties. This means it is made of material with a rather low Curie point, approximately 150° or even below. This material may have chromium dioxide as its predominant component. The material having the surface 10, may for example, be a sheet or tape, with a Polyester base and a chromium dioxide coating thereon, or it may be the surface of a drum, disc or the like, having a coating with chromium dioxide as its dominant component and being deposited on a suitably rigid backing member. Tapes suitable for the inventive purpose are disclosed for example in French Pat. Nos. 1,452,583 and 1,453,142.

At room temperature storage carrier 10 has a remanence which permits substantial retention of magnetization. At a temperature (Curie point) above room temperature, but well below the Curie point of most ferromagnetic metals or metal oxides, the remanence as well as any remanent magnetization drops to zero. This phenomenon was mentioned above and it will be discussed now with reference to FIG. 2a. Numeral 110 denotes the regular hysteresis loop of the material at room temperature, with $\pm B_r$ denoting the saturation remanence. $H_s$ denotes approximately the minimum magnetic field needed to saturate the material at room temperature, and $\pm H_c$ is the coercive force. At a high temperature, but somewhat below the Curie point, the loop contracts, as for example, shown in curve 111. $\pm H_1$ denotes the magnetic field needed at that particular temperature to produce saturation at that temperature. The significance thereof will be explained below.

Figures 1A, 1B, 2A, 2B, 2C, 3:
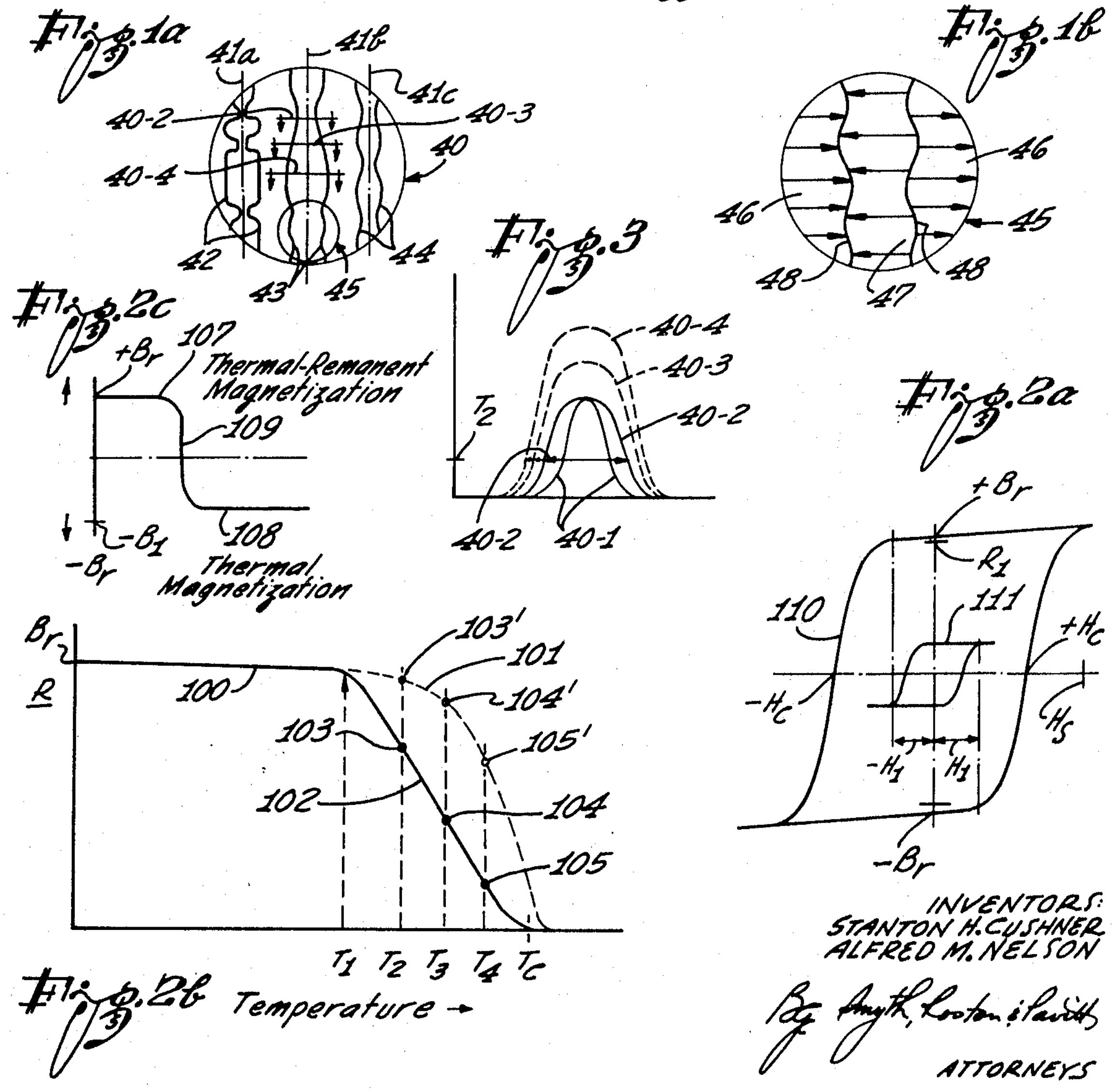
FIG. 3 illustrates the distribution of thermal energy across a recording track produced with the station shown in FIG. 1.

FIG. 2b illustrates the remanence vs. temperature characteristics of such a material. The abscissa of the diagram shows remanence as well as actual remanent magnetization, which are identical if one assumes initial saturation. The abscissa intersects the ordinate at room temperature. The portion 100 of the plotted curve originates at value $B_r$ which is the remanence, i.e., a saturation remanent magnetization induced externally at room temperature to impart a permanent saturation magnetization upon the material of the tape 10. The portion 100 is slightly sloped (downward). At a temperature $T_1$, somewhat above 100° C., the remanent magnetization begins to drop with increasing temperature, resulting in sloping portion 102, and at the Curie temperature $T_c$ of, for example 150° C. the material becomes paramagnetic. The curve 100—102 construed as remanence in the abstract, i.e., as a physical characteristic of potential saturation magnetization at that temperature is reversible as far as change in temperature is concerned. The curve 100—102 cannot be construed as reversible if one considers actual remanent magnetization. Particularly the branch 102 will be observed in that fashion only when the retained magnetization is observed during a heating step. The magnetization will not increase during a subsequent cooling period along branch 102. This leads to curve 101 which has been derived as follows:

Assuming that the temperature of the magnetized material was raised, for example, to $T_2$, the remanence and remanent magnetization then has dropped to a point 103. If subsequently the temperature is reduced again below $T_1$, for example, down to room temperature, the remanence as behavior characteristics, of course, is restored, but the remanent magnetization increases again to attain the value 103′ on curve 101, which is below $B_r$. If the material is heated to a maximum temperature below or not much exceeding the beginning of the roll off ($T_1$), the original remanent magnetization will be restored. If after an initial saturation at room temperature, the temperature is increased, for example, to a maximum value of $T_3$ or $T_4$, the remanent magnetization drops to 104 or 105. Subsequently the temperature is lowered again to room temperature, but the magnetization, i.e., dipole alignment is partially irreversibly destroyed, so that the remanent magnetization observed after cooling has only values determined by points 104′ and 105′ respectively. At temperatures above $T_c$, the material becomes paramagnetic and the thermal movement in the material causes the dipoles in the material to become randomly arranged. This random arrangement remains after lowering of the temperatures until a new magnetizing field is applied externally.

Thus, curve 101 indicates the residual remanence or thermoremanent magnetization of a material having been magnetized originally, then heated up to a maximum temperature as plotted on the abscissa, and having been cooled again thereafter. It is apparent that curve 101 is the more important one, as it shows actual magnetization observed and retained after magnetization, heating and cooling, so that this curve 101 represents the characteristics, so to speak, of the final product.

We now return to FIG. 1; the storage carrier 10 is advanced by a drive 11 of general design; for example, it may be a tape reel motor, a capstan motor, a drum motor, a turntable motor, etc. as is conventional for this type of equipment. This storage carrier 10 as advanced by drive 11 first passes a magnetizing station 12 which may be an electromagnetic transducer with a transducer gap 15. The gap 15 extends across the storage carrier 10 and perpendicular to the direction of the movement of the carrier 10. The transducer 12 is provided with a magnetizing coil 13 to which is fed a DC signal from a voltage supply source 16, so that a uniform field is set up between the pole shoes defining gap 15. The purpose of this particular magnetizing transducer 12 is to provide longitudinal magnetization of uniform polarity in the surface of the storage carrier 10. Preferably the magnetization produced in carrier 10 saturates the carrier, for example, in the direction of movement of the carrier. The main point is that the magnetization is a rather uniform one. This, however, can be subjected to a qualification. If saturation remanent magnetization is produced, all that is required is that the magnetic field suffices to do just that. Some inhomogeneities in the applied field are not critical as long as the magnetization produced in the carrier is homogeneous.

Two additional points are to be emphasized here. First, the magnetic transducer 12 does not have to be and actually should not be in physical contact with the carrier 10, so that there is no mechanical, i.e., abrasive interaction between transducer and carrier. The magnetic field needed for magnetizing the carrier must thus be sufficiently strong as there will be an air gap between transducer and carrier, but this does not present any problem. Of course, such a gap enlarges the area of the carrier affected at any instant by the magnetizing field which leads to the second point. No area resolution is required by this magnetization, as uniformity is the main objective so that the area affected at any instant can be quite large. This means, that the gap 15 can be rather wide, and actually it should be considerably wider than the spacing between transducer and carrier, or that the field set up by the transducer is forced to pass through the carrier indeed. Moreover, it is possible to substitute the transducer 12 by a permanent magnet, which may even be positioned underneath tape 10.

The storage carrier 10 leaves this magnetizing station 12 with a permanent magnetization preferably at saturation level. The carrier 10 then passes through a second station 20 which heats the carrier from underneath. The thermal energy may be provided by a lamp 21 emitting, for example, a large amount of infrared radiation and extending again across the storage carrier, and also transversely to the direction of storage carrier movement. The heating station includes an infrared detector 22, thermally shielded from the direct radiation of lamp 21 and monitoring the temperature of the carrier. An error signal detector 25 with command signal input at 23 receives the output of detector 22 to establish an error signal if the temperature as monitored by the detector 22 deviates from the value adjusted at the command input at line 23. The network 25 provides an error signal and a corresponding power amplification to control the heating element 21 in accordance with a predetermined control and regulating characteristics.

The purpose of the heating station 20 is to establish a particular temperature level of the magnetized storage carrier 10, in order to provide a thermal biasing condition. Looking at the characteristics shown in FIG. 2, the temperature selected for the bias may be $T_1$ or $T_2$ or a value in that range. Thus, it should be a temperature which does not destroy or even materially diminish the magnetization in the carrier after a return to room temperature. On the other hand, only a small temperature rise above the biasing level should suffice to reduce the thermoremanent magnetization permanently at an area so heated additionally.

Up to this point, the elements as described are elements which serve for the preparation of the storage carrier for the recording proper. The preparation basically comprises a premagnetization and a thermal bias close to or even in the roll-off portion of the magnetization vs. temperature characteristics.

We proceed now to the description of the elements which provide the control for the recording of intelligence information on the storage carrier. Element 50, for example, denotes a TV camera such as a vidicon with associated circuitry, and which observes a particular scenery live; it may scan a film, a document, etc. The TV camera 50 feeds its output signal to a stage 51 designated in general as a signal processor, and it may include amplifying stages to raise the output signal of the TV camera to a more suitable level. The output signal of the signal processor 51 is in the form of signal train and is fed to the control circuit which controls the signal strength of an electron gun in a cathode-ray tube 31. In particular, the control element for the cathode-ray tube will be a grid or grid assembly in the control portion of the electron gun of the tube 31, and the output signal of the processor 51 is applied thereto so as to modulate the intensity of the electron beam.

The cathode-ray tube 31 may be constructed preferably to be rather thin in the direction of movement of the carrier 10, but it extends clear across the width of carrier 10. The front face of the tube 31 has a thin and narrow strip 32 of luminescent material defining the screen of this CRT. Thus, the cathode-ray tube 31 is designed not for two dimensional scanning, but it serves as a linear scanner.

The CRT 31 has a beam deflector control circuit 33 which deflects the electron beam at a particular rate. Beginning at the end 34 of the tube adjacent to one edge of the carrier 10, the beam runs to the other end of the screen of tube 31, whereupon there occurs a fast retrace to the end 34, etc.; there is no concurrent deflection of the electron beam in any other direction.

The network 33 may be comprised of a conventional sawtooth oscillator or generator which provides for a continuous transverse scanning in a direction perpendicular to the direction of movement of carrier 10 and across the surface thereof. The point of interaction of the electron beam with the luminescent screen 32 thus constitutes a flying spot which emits radiant energy. The spot will be round with maximum density in its center. Fiber optics 36 are used to "focus", i.e., concentrate the light spot into a very thin, high intensity beam. The exit window of the fiber optic 36 terminates very close to the thermomagnetic surface of carrier 10. The light beam preferably has dimensions larger in the direction of deflection of the cathode-ray in tube 31 than in the direction of movement of carrier 10. Thus, a thin line or light bar having a narrow dimension in the direction of movement of carrier 10, and having its long dimension in the direction of scanning, travels across the surface of carrier 10 along an imaginary tracking line 41. The contraction of the width of the light spot on screen strip 32 perpendicular to the direction of scanning is not essential but of advantage so as to increase the radiation density as it affects the carrier 10. The size of the light bar in any direction is determined by the focusing ability of the fiber optic.

During operation the electron beam in the tube 31 will run across the luminescent screen 32. The resulting light dot is focused on this bar and runs from one edge of the carrier 10 along track 41 to the other one, whereupon it is returned at a rapid rate. It is apparent that it will be convenient to select the repetition rate of the scanner tube 31 equal to the horizontal scanning rate as provided by the TV camera 50, or as an integral multiple thereof. Thus, it may be convenient to slave the deflection control circuit 33 for the tube 31 to a scanning control network 52 which controls also the TV camera 50. For reasons of synchronous operation it may be advisable further to control the storage carrier drive 11 also from the scanning device 52 in order to correlate the advancing of the storage carrier 10 to the crosswise scanning operation.

It can thus be seen that during operation the carrier 10 is advanced continuously by the drive 11. The TV camera signal together with all control signals necessary for a TV picture is passed in a line-by-line format to the cathode ray tube 31 which provides a modulated flying spot as its electron beam runs over the luminescent screen 32. The resulting light spot of variable intensity runs also transversely to the direction of movement of the storage carrier 10. The spot is focused to a thin line colinear with track 41. Thus, from a more general point of view, a region of densely concentrated radiation of variable intensity runs transversely over the surface of the storage carrier 10 thereby providing localized and variable heating thereof.

Consider now a point on the carrier over which the recording spot has just passed. This is shown representatively in FIG. 3, wherein the curve 40–1 denotes the amount of energy per unit length absorbed by a region having a width equal to the length of the light bar in the direction of track 41. The graph shows the energy distribution perpendicularly to the track.

The radiant energy as absorbed results in a development of thermal energy in the surface of carrier 10. The distribution of the thermal energy thus produced raises the temperature and the resulting temperature distribution will follow the same curve 40–1. This sets up immediately a temperature gradient to the environment. This environment can be considered as being divisible in these three portions.

First, there is contact with the cool air above the surface. Next there is the interior region of the carrier which was not reached by radiant energy due to the absorption by the surface layer. Finally, there are the adjacent surface regions outside of the area which were reached by the light beam; these are the regions to the left and right of the bell-shaped curve in FIG. 3.

It is now a basic interest that as much energy as possible can be removed by the air above the surface and by conduction into the interior of the carrier, so that very little energy spreads laterally in the surface of the carrier perpendicularly to the track. To state it differently, it is of interest to keep the surface areas which reach peak temperature at any instant as small as possible in comparison with the surrounding surface areas.

This is accomplished in two ways: First, the fiber optic 36 provides for optical concentration because it focuses the light beam in the same direction in which spreading of energy is to be prevented. Of course, the better the optical properties of the fiber optic 36 the better the concentration. The optical concentration produced by fiber optic 36 thus results in a restriction in the area affected directly by the spot at any instant and also increases the energy density of the affected area.

The second factor for restricting lateral spreading of thermal energy is to provide the required amount of radiant energy for establishing a particular temperature of an area increment along the track, in a very short time. For this, it is of advantage to select a rather high scanning speed and to use a fluorescent material for screen 32 rather than a phosphorescent one. Of course, lateral spreading of energy cannot be inhibited, and the curve 40–2 represents the maximum temperature reached by the affected surface region.

The intensity of the localized heating is a function of the signal amplitude as it is provided by the signal processor 51 at any instant. Thus, curves 40–3 and 40–4 are corresponding temperature distribution curves for different intensities of the recording beam along the track. In dependence upon this varying signal amplitude the magnetization of the storage carrier 10 is more or less erased. The maximum erasure, of course, occurs in the center of a track, with decreasing intensity of erasing to both sides following the curve 40–2 (or 40–3 or 40–4) in FIG. 3. The base (abscissa) of FIG. 3 may correspond to an ordinate temperature value which is equal to the thermal bias at the instant of recording. This thermal bias was produced in the heating station but allowing for some temperature reduction due to cooling from the time of bias heating to the instant immediately preceding incidence of the recording beam. This temperature may be, for example, $T_1$ (FIG. 2*b*).

Regions heated above the temperature level of about $T_2$ (this is not sharply fixed) will experience some irreversible destruction of the magnetization and this will appear after cooling as a modulated thermoremanent magnetization. The modulation is a two-fold one. The curves 40–2, 40–3, 40–4 may be representative of an increase in signal strength along the track. The increase in the center amounts to a gradual decrease in the thermoremanent magnetization, and additionally the affected area along the track widens as denoted by the arrows in FIG. 3 at level $T_2$.

FIG. 1*a* illustrates the circles area 40 of FIG. 1 as enlargement and schematic representation of a recording. There are shown portions of three parallel tracks 41*a*, 41*b* and 41*c*. The lines 42, 43 and 44 denote the borders of the three areas on the carrier respectively pertaining to the three tracks and in which magnetization is to some extent destroyed. $T_2$ is the approximate level denoting the maximum temperature which when reached affects the remanent magnetization very little. As was explained with reference to FIG. 3, the width of the affected areas varies in proportion to the maximum amplitude and this produces the contour of lines 42,43 and 44.

In the region along the centerline of a track the thermoremanent magnetization is reduced to the maximum degree as determined by the maximum temperature for which the carrier was heated along tracks 41*a*, 41*b* and 41*c*. It is apparent that the lateral spreading of the heat does not necessarily mean a loss in information, but a high concentration of the beam to reduce spreading is essential for operating the system at high capacity.

It can now be seen that the recording system establishes a particular minimum rate at which the carrier 10 has to move. The carrier 10 has to move during one scanning cycle for a distance not smaller than the maximum width of affected areas according to lines 42, 43, etc. This is approximately the width of the focused dot itself measured in direction of carrier movement. This width may be in the order of a milli-inch or less, so that about two TV frames can be accommodated on one inch of a tape when used as a carrier and the minimum speed of the carrier 10 will be in the range of 15 i.p.s.

In case spreading of energy is material, the tape must move faster because the scanning lines must not be closer (measured from center to center) than the maximum possible spreading. This is the practical limit for a minimum tape speed.

FIG. 1*a* and FIG. 3 can be interpreted in a somewhat different manner. If we assume that the recording beam has a somewhat higher energy, the level denoted as $T_2$ may be actually the Curie point. In this case, all areas across and along the track which have been heated above that level have no magnetization left, i.e., after cooling the thermoremanent magnetization is zero. In this case, the modulation as recorded shows up only in the contour lines 42, 43 and 44 as borders separating the unimpaired magnetization between tracks from the destroyed magnetization along the tracks at variable width. If the readout process is to be carried out without line tracking and without loss of resolution, the distance from center to center of neighboring tracks should be about equal to the track width at maximum signal strength.

The magnetization recording as provided thus far is only a unipolar one. The information is stored in that the initial magnetization is reduced to a varying degree. The thermoremanent magnetization results in an "erasing" pattern as shown in FIG. 1*a*. In case of binary-digital information having no half-tones, the information varies after cooling between thermoremanent magnetization approximately equal to the saturation remanence $B_r$, and no magnetization, as the carrier may be heated here beyond the Curie point in the pertinent information areas. However, one can provide an image contrast enhancement by applying to the tape a weak magnetic field in the reverse direction to affect only those portions of the tape which are heated by the information beam, because only those heated portions have a low coercivity.

At elevated temperatures and in the range close to the Curie point, but not exceeding same, a very small magnetic field suffices to change the orientation of the rather weak dipoles in the heated magnetic material. If the Curie point is exceeded, the small field may even saturate the carrier in the reverse as the domains grow back under the aligning influence of the weak field. On the other hand, regions which remain cool will not be affected by such a magnetic field.

This magnetic field is provided by the two coils 37 and 38, and it tends to magnetize the tape in the direction opposite to the magnetization provided by the transducer 12. In the regions heated by a rather high intensity information beam, the magnetization is reversed, while in the regions of low or zero beam intensity, the remanent magnetization is unaffected, provided the reversing field is below the coercivity of the material.

FIG. 2*a* illustrates this behavior. The premagnetization field $H_S$ is provided by transducer 12 to establish saturation remanence $+B_r$ as initial magnetization. The magnetic field provided by coils 37 and 38 is $-H_1$, i.e., it is opposite to the direction of field $H_S$. It can thus be seen, that if the coercivity $-H_c$ has a larger absolute value than $-H_1$, then the thermoremanent magnetization is not altered by this field for temperatures below, say $T_2$ in FIG. 2*b*. These are the regions which were outside of the borders 42, etc. in FIG. 1*a*.

The situation is different in those regions heated to a temperature so that the hysteresis loop has been contracted comparably with curve 111 in FIG. 2*a*, or somewhat more still or somewhat less. Here the field $-H_1$, is comparable with the coercivity of the material at the elevated temperature and this suffices to materially change the magnetization of such an area, even to saturate it in the negative direction at that temperature. This means, that the dipoles have been completely reversed in those regions in which at maximum temperature the value of the coercive force is smaller than the field $-H_1$.

The characteristics plotted in FIG. 2*c* are illustrative of this relationship. The abscissa shows temperatures (increasing to the right). The ordinate values have been determined in the following manner; At room temperature (intersection of ordinate and abscissa) the material is saturated ($+B_r$); then the material is heated to a particular maximum temperature value serving as an abscissa value. A reversing field of low strength is then applied and maintained during cooling. The residual magnetization is then determined and plotted as ordinate value over the abscissa value of maximum temperature.

The branch 107 is illustrative of the fact that a thermal and magnetic treatment in the temperature range well below the Curie point does not, or only to a negligible degree, influence the magnetization. Branch 108 is plotted over abscissa values for which the material became paramagnetic; it is indicative of what was defined above as thermomagnetization. The original magnetization is completely destroyed as the Curie point is exceeded, and the weak magnetic field realigns the dipoles during ing cooling. The final magnetization is not quite the negative remanence $-B_r$. The magnetic field $-H_1$ is constant, covering a rather large carrier area, and the field will persist during cooling. Thus, the magnetic domains established by the realigned dipoles are permitted to grow under the influence of a weak but persisting field.

The branch 109 shows the temperature region wherein always a very small change in the maximum temperature reached affects materially the residual magnetization. The upper portion of branch 109 is a combination of thermoremanent magnetization with demagnetization superimposed by operation of the weak reversing field. The lower portion of branch 109 shows thermomagnetization and in the reverse direction. The temperature where the curve 109 intersects the abscissa is somewhat below the Curie point but very close to it. The intersecting temperature will depend somewhat upon the strength of the reversing field, and thus has no immediate significance.

The recording portion encircled at 45 in FIG. 1*a* is shown enlarged in FIG. 1*b*. FIG. 1*b* shows additionally the case in which a current is supplied to coils 37 and 38 to set up the reversing field $-H_1$. The zones 46 are outside of the reversing field $-H_1$. The zones 46 are outside of the recording area proper, i.e., they are the space left in between tracks and have the original magnetization. The zone 47 has been sufficiently demagnetized by the information beam so that here the coils 37 and 38 could magnetize the carrier in the opposite direction, possibly up to saturation, as it requires only a small field at elevated temperatures to produce full saturation. This was called above thermomagnetization. Along the borders 48 the magnetic field $-H_1$ demagnetized the already weak remanent magnetization at the elevated temperature, so that the resulting permanent magnetization reverses its polarity along the borders 48 between regions 46 and 47 (branch 109 in FIG. 2*c*).

It should be noted specifically that heating of the center regions 47 may well have resulted in a temporary paramagnetic state. As the material cools, the weak field $-H_1$ will substantially produce saturation even though the field $-H_1$ would be unable to do so at room temperature. Strictly speaking, during the process of concurrent heating and magnetizing, there is a zone between the zones 46 and 47 in which the magnetization is low and reverses its direction. Thus, there is at first a not too narrow border zone obtaining nonsaturation magnetization in accordance with the branch 109 on the curve in FIG. 2*c*. However, after cooling the saturation magnetization of zones 46 and 47 will tend to narrow this border zone. Many dipoles not completely aligned along the border zone during the heating and remagnetization will align themselves under the strong magnetic influence of the neighboring zones, 46 or 47, leaving only a very thin border 48.

This points also to an important purpose of the low coercivity buffer field used concurrently with the heating. The resulting permanent magnetization in the thermally erased zones prevents subsequent remagnetization thereof from the magnetic field emanated from the portions of the carrier which remained below the Curie point.

The discussion of the reversing field above revealed that a weak magnetic field applied to the carrier at high temperatures may saturate or almost saturate the carrier. The same principle can be applied to the initial biasing field. For example, the sequence of stations 12 and 20 can be exchanged, and the cooling flow of air may be applied to the entire carrier area as it is concurrently underneath the transducer 13 as well as in the recording area proper. Moreover, the transducer 13 may be rather close to the recording station.

In this case of exchanging the sequence the heating station heats the carrier close to or even above the Curie point. A weak field is set up by the transducer and producer near saturation as the carrier cools down. The transducer gap must be wide enough, so that the carrier cools sufficiently below the Curie point while still under the gap. The carrier will cool to the biasing temperature such as $T_1$ before reaching the scanning area covered by the beam. The recording them proceeds as aforedescribed. If the sequence of stations through which the carrier passes is as illustrated, then the premagnetizing transducer erases any prior magnetization on the carrier. If the sequence of heating and premagnetizing is a reversed one, then the heating station will partially or completely erase any prior magnetization; any residual magnetization on the tape from previous recordings is then completely erased by the transducer of the premagnetizing station.

This now leads to another modification, namely that premagnetizing station 12 can be entirely dispensed with, and the information can be imparted upon the magnetizing coils 36, 37 and 38, while the electron beam and the light spot has constant intensity. A general discussion of this type of operation, however, will be deferred until the embodiment shown in FIG. 5 will be explained in detail, and one skilled in the art will then readily ascertain that what will be said below with reference to FIG. 5 is equally applicable for this reversion of the operation of the embodiment shown in FIG. 1.

It should be mentioned, as a general point, that the luminescent layer used for the layer 32 on the recording cathode-ray tube 31 is not utilized merely as to its output in the visible range. The layer 32 has as its principal purpose the conversion of the energy of the electron beam into radiation which can be absorbed rapidly by the carrier. More precisely, radiation is needed which penetrates very little into the carrier and is absorbed for increasing the molecular motion in the carrier rather than producing a change in quantum states, ionization, etc. It is well apparent that the visibility of the beam as it is produced by the fiber optic 36 is entirely immaterial. The crucial point is that as much energy as possible can be concentrated onto a small portion of the surface of carrier 10 to produce localized heating.

Figures 4, 5, 6, 6A, 7:
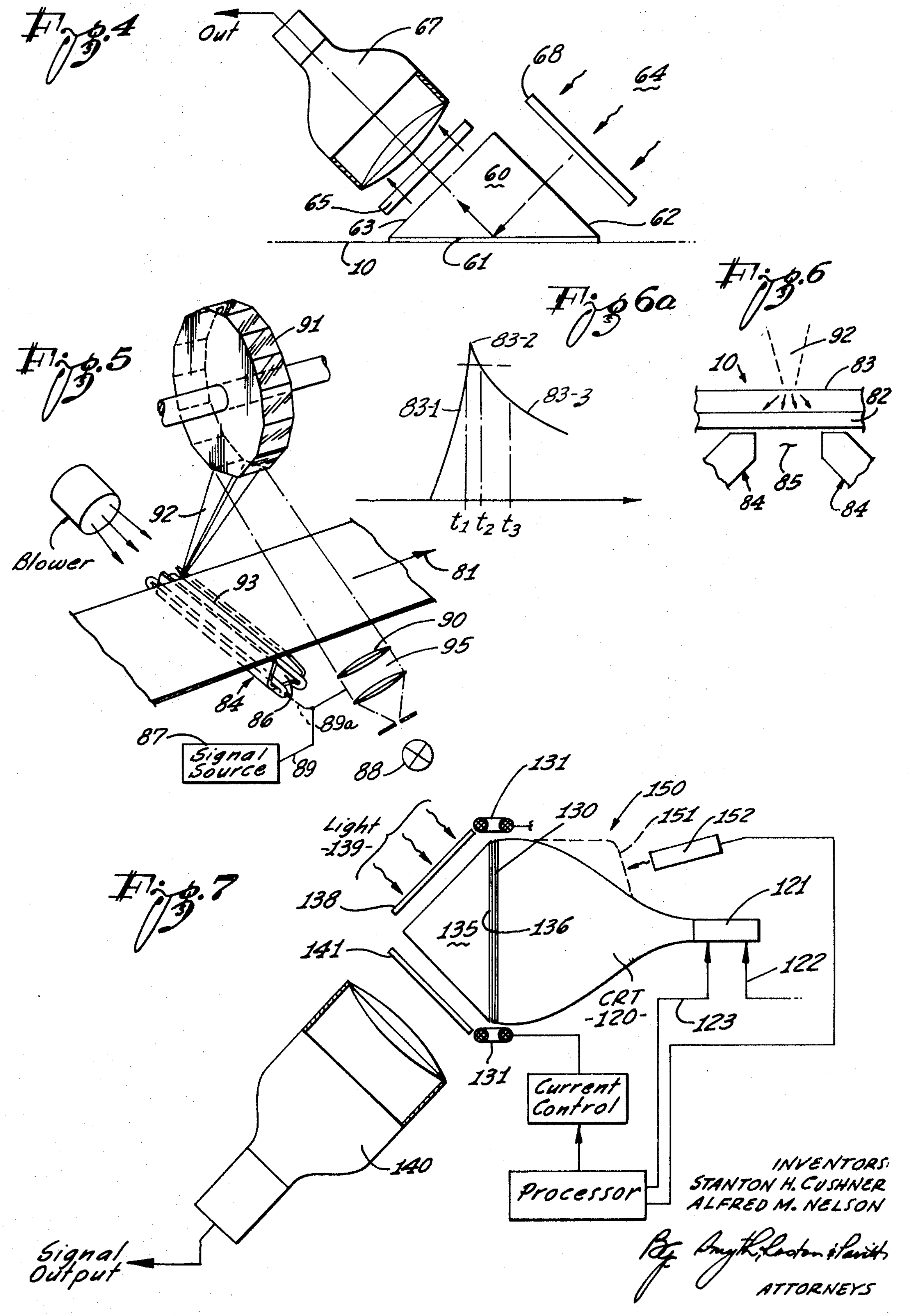
FIG. 4 illustrates in perspective view but somewhat schematically a magneto optical readout station for reading the recording made on the carrier shown in FIG. 1.
FIG. 5 illustrates in perspective view but somewhat schematically an alternate embodiment for a recording station within the concept of the present invention.
FIG. 6 illustrates a detail of the recording station shown in FIG. 5.
FIG. 6a illustrates a temperature vs. time characteristic in a spot as heated by a beam in the station shown in FIG. 5.
FIG. 7 illustrates schematically an elevation of a storage memory using the principles of the present invention.

Proceeding now to the description of FIG. 4 there is shown a readout station for the recovery of the signal as it has been recorded on the storage carrier 10. A readout station of this type is shown, for example in U.S. Letters Pat. No. 3,196,206. Improvements in the production of magneto-optical effect are further disclosed in patent applications of common assignee having at least one of us as co-applicant and having Ser. No. 539,386 filed Apr. 1, 1966 and Ser. No. 582,721 filed Sept. 28, 1966.

Briefly speaking such a readout station requires a collimated light beam 64 directed towards a prism 60 through a polarizer 68. The prism 60 has its base surface covered with a layer 61 which includes a thin film of ferromagnetic material, this being preferably a material which is highly magnetizable (large remanence) but having a low coercivity, so that the strength of the field necessary to establish magnetization, preferably at saturation level, and even to reverse magnetization is low indeed. The film may have a thickness of a few hundred Angstroms. A thickness of this dimension will provide a maximum sensitivity and response to magnetic signal states present on the carrier 10. The layer 61 may include others such as disclosed in above-mentioned patent and copending applications.

The base of the prism 60 must be sufficiently large to cover the entire width of carrier 10. The prism 60 has two flat surfaces, such as 62 and 63 which are, for example, perpendicular to each other but this is not essential. Surface 62 should be oriented perpendicularly to the direction of the collimated light beam, i.e., prism surface 60 is coplanar with light wave fronts of this beam 64. The polarizer 68 causes the light to become polarized in a plane extending transversely to the direction of propagation of beam 64.

The polarized light entering prism 60 will be reflected by total reflection at the inner base surface of the prism 60, whereby the area of reflection is contiguous with the magnetic material of film 61. Thus, any light which is reflected by the base surface of prism 60, is subjected to a rotation of its plane of polarization due to magneto optic effects. An analyzer 65 is positioned close to the exit window 63 of the prism 60. The particular plane of polarization defining the passage range of the analyzer will be discussed more fully below.

The light which leaves the analyzer 65 is monitored, for example, by a TV camera tube 67. The tape 10 is moved intermittently and stops during readout scanning. The line-for-line scanning may run parallel to the recording line pattern or transversely thereto. By no means is it necessary to track the individual recording lines. The resulting output of tube 67 is a linear signal train representing as a whole the information as it was provided during recording with and in the device outlined with reference to FIG. 1, but the output signal will not be a of the input recording signal as the scanning operations differ.

It can be noticed here that the signal itself as read by the tube 67 can be used to control the scanning circuit, if the signal as recorded is in fact a video signal which includes all of the control signals necessary to run a flying spot scanning device, provided further that for readout scanning a line pattern is used running parallel to the recording lines. It has to be observed here that the horizontal sync pulses which form a part of this video signal are all aligned in longitudinal direction along the tape 10, so that the recording of all of the horizontal sync pulses can be picked up and used as control even though the readout line pattern does not match the recording line pattern. This is particularly prevalent when the number of lines per frame differ for recording and reproducing operations which may well occur if recording and reproduction occurs in different countries with different TV systems. Thus, the recorded sync pulses can be used to control the operation of the TV tube 67.

In order to determine the required orientation of the polarization planes of polarization and analyzer, the readout process must be considered in some detail. As the surface 10 passes in close proximity to and possibly in engagement with the outer surface of the thin film in layer 61, the local magnetization in the surface of carrier 10 after the recording induces a magnetic field into the thin ferromagnetic film in layer 61. This magnetic field varies locally as it is a "negative" replica of the recording made here and particularly of the modulated magnetization of the juxtaposed carrier surface portion. This includes the regions of field reversal if provided (FIG. 1*b*). As the carrier 10 travels past the film in layer 61, the induced field, i.e., the magnetization in the film in layer 61 travels likewise in the same direction because of the low coercivity of the film in layer 61. As the film in layer 61 is very thin, and provided the contact between carrier 10 and film is uniformly close, the magnetization induced in the film will travel along in the film because, of course, the area-magnetic modulation of carrier 10 travels therewith.

The regions of reduced magnetization or even regions having saturation in the reverse as compared with the original magnetization of maximum signal strength, define the information proper as it was recorded and is now reproduced. Therefore, the passage range of analyzer 65 should be selected so that light as rotated by the original remanent magnetization is passed at maximum intensity. The information, i.e., thermoremanent magnetization or thermomagnetization in carrier 10 wherever observed causes a different rotation of the plane of polarization and will thus be attenuated by the analyzer. Of course, this is not the only way of producing an optical contrast in response to the differing magnetization. The planes of polarization of analyzer and polarizer can be oriented in such a manner that maximum thermomagnetization (area 47 in FIG. 1*b*) provided maximum light output at the output side of the analyzer, while zero magnetization or the original magnetization dims the light. From an optical standpoint both cases are equivalent, contrast producing situations.

Considering FIGS. 1 and 4 together, one can see here that the device has a resolution which, on one hand, is determined by the spatial resolution of the luminescent layer 32 along a recording track and by the focusing ability of the fiber optic 36.

Another limiting factor to the resolution is the accuracy with which the readout scanner 67 can be adjusted to restrict its detection operation to just one track. In the entire transducing system, say from the TV camera 50 to reproducing device 69, information is not used to control any magnetic induction. The premagnetization covers large areas concurrently. Hence, the discernibility of information is not impeded by any transducer gap. Neither transducer 12 nor the coil assembly 37 and 38 provide directly information to the carrier, but these magnetizing devices serve only as record preparing equipment. Input and output for the information signals involve only optical phenomenon in the general sense, in that for recording one uses a concentrated beam of radiant energy and for reproducing or readout a collimated beam of polarized light is being used.

As stated above, upon optical recording a line-for-line magnetic image is fixed onto the carrier 10 and remains thereon as a permanent magnetization which is not subject to decay. It does not need any additional processing but is available for readout immediately. Thus, a readout station such as shown in FIG. 4 may in the general case be provided farther down in the path of progression of the carrier 10, so as to monitor instantly the recordation of the signal as it was recorded so as to monitor continuously the quality of the recordation. In case of digital signals, a running read-after-write check can thus be provided. For regular TV, the readout station may be a monitor. In this case the tube 67 can be operated from the same scanning control network 52, as is the TV camera 50 and the recording device. This still does not require line-for-line tracking during readout.

It is, of course, essential that subsequent to recording the temperature of the carrier 10 must remain always below the operating temperature range used for recording. Thus, the intensity of the readout beam must not provide heating of the storage carrier up to or even above and beyond the Curie point. This, however, poses no problem because the beam from source 64 is collimated and not concentrated, the polarizer 68 operates already as a filter, and most importantly, the read out beam is reflected by the prism by total reflection.

FIGS. 5 and 6 illustrate a modification of the inventive system, particularly to demonstrate the fact that for recording the principle involved here resides in the cooperation of localized heating by a radiation beam and of a magnetic field (or two fields), and that the recording process is restricted to the spot on the carrier which is heated at any instant. Again, reference numeral 10 denotes a recording medium or storage carrier such as a tape advancing in direction of the arrow 81. The carrier is comprised of a transparent backing member 82 such as polyester bearing a rather thin layer 83 having as its predominant active constituent chromium dioxide. In the drawing, this thermomagnetic layer faces up. The recording medium may be premagnetized at positive saturation level.

The recording station has as its first component a transducer 84 extending across the tape at the underside thereof, without contacting the magnetizable layer 83. The transducer gap 85 should be small, but its dimensions are not critical. The transducer has a coil 86 which provides unidirectional magnetic induction for the transducer. The magnetic field set up by the transducer as it is effective, is also here a rather small one; is maximum amplitude is denoted with $-H_1$ and may be in the order of 10 to 200 Oersteds.

The energy for a heating beam is provided by a light source 88 which may be an ordinary incandescent lamp. As an incandescent lamp furnishes energy at a much higher output level than a fluorescent screen, no preheating is required here. Alternatively the light source may be a laser producing light at a high energy level. In this case the carrier does not have to have a low Curie point but must be mounted on a backing member which can withstand high temperatures. A lens system 90 focuses the light beam in a particular focal area. Included in the optical system 90 is a so-called light valve 95, the transparency of which can be controlled by electrical signals derived from a signal source 87 through a signal line or channel 89 and which provides the information to be recorded.

A mirror wheel 91 is interposed in the light path from the lens system 90. The mirror wheel 91 has an axis of rotation parallel to the direction of movement of tape 10, i.e., parallel to arrow 81. The mirror wheel 91 is positioned in such a manner that at any instant one of its mirrors directs a light beam 92 onto the tape 10, whereby the area of interaction of beam and tape substantially coincides with the focal area of the beam.

Upon rotation of this mirror wheel 91 the light spot moves transversely to the tape 10 along a track 93. Furthermore, the dimensions are selected so that at an instant when one mirror has a position so that the focused light beam is about to leave the edge of the tape, another mirror enters the range of the light beam. It is quite possible that the second mirror has already a position in which it intercepts a portion of the light beam to begin recording on the adjacent other edge, so that actually the same information is being recorded twice near the edges of the tape 10. This double recording ensures that information will not be lost, and that in fact there is continuous recording along the interrupted track and transverse to the direction of tape movement.

We now proceed to the details of the recording process. The focal length of the lens system 90 is preferably rather large, for this reason. The rotation of mirror 91 causes the focused spot to move along an arc. This arc will be rather flat if the local length of the lens 90 is large. Even if the tape 10 is flat, the resulting deviation of the exact focusing distance from the interception with the tape can be rather small and negligible. However, curving of the tape in the plane of movement of beam 92 aids the resolution of the system.

The mirror wheel will cause a thermotrack to be inscribed onto the magnetizable layer 83. Depending upon the signals from source 87, light valve 95 permits more or less light to pass, so that again a line of variable width is produced.

The track inscribing devices as illustrated and described above shows types of records affecting two dimensional storage surfaces to the utmost extent possible, so that the capacity of a given size storage surface can be used to the full extent. This, however, is not mandatory for practicing the invention. Hence, a single or several longitudinal tracks can be recorded on a tape. Thus, the mirror wheel interceptor may be omitted, and optic 90 may focus directly and stationarily onto the tape, while the tape movement causes a longitudinal track to result from the beam-tape interaction. Multiple tracks can be inscribed by duplicating (multiplying) the optical system.

In a manner analogous to the embodiment shown in FIG. 1, there may be provided a premagnetizing station (not shown in FIG. 5) to impart an initial magnetization upon the tape, and the recording produced will then be as shown in FIG. 1*b*.

FIG. 5 illustrates another modification whereby actually another specific embodiment of the present invention is included which embodiment, as far as pictorial representation is concerned, can result from FIG. 5 simply by connecting the output channel 89 to the transducer coil 86, as is symbolically denoted with dotted line 89*a*. Furthermore the controllable light valve 95 could be omitted in this case so that the light beam 92 has a fixed and constant intensity. Of course a focusing device such as lens system 90 has to be provided for as a sharply focused beam is still essential.

In this case the modulator signal is applied to the transducer 84. The transducer thus provides a variable magnetization to tape 10 across its entire width and for a length in direction of tape propagation equal to the transducer gap width. If that magnetization were high enough, i.e., comparable with the signal strength as used normally for magnetic recording, a broad track over the entire width of the tape would be provided therewith. However, the tape speed is to be rather low so that the fidelity and bandwidth of the recorded information would then be very low, particularly considerably below the desired one. Presently, however, the amplitude of the information signal as applied to coil 86 is below room temperature coercivity, so that if the device were operated everywhere at room temperature (absence of light source 88) no recording at all would result. However, the light beam 92 is caused to travel across the tape as aforedescribed, thus lowering the effective coercivity in sequential spots and rendering therein the material temporarily paramagnetic. For any such spot so treated the carrier 10 becomes susceptible for receiving this information magnetization at below room temperature coercivity amplitudes.

Of critical importance now is the speed with which a spot when heated cools subsequently below the Curie point. Magnetizable layers used for magnetic recording are very thin and it has been found that the thermal capacity of any region is very low indeed. If one uses chromium dioxide as one of the constituents for such a layer and if one does not heat any spot excessively, then the decay of thermal energy will be extremely short. Specifically here the thermal decay time of interest is the time that elapses from cessation of heating of a spot up to the time the temperature of that spot drops considerably below the Curie point.

FIG. 6*a* illustrates the temperature of the specific spot on tape 10. It may be assumed that it is a spot which is in the path of the center of the focused beam 92 as it propagates across the tape 10. As the focused beam approaches that specific spot its temperature gradually increases in accordance with the sloping portions 83–1 of the curve as shown in FIG. 6*a*. This gradual temperature increase is due to the fact that a sharply focused beam still has a gaussian intensity distribution around its theoretical focal point and, of course, the size of such focal spot depends on the quality of the focusing system, the monochromaticity of the light source, etc. It is well known that a focal spot actually covers always a finite area and the intensity therein follows a gaussian distribution which is more or less sharply pronounced.

As the focused light beam approaches the particular spot under consideration the temperature thereof is raised gradually in accordance with the approach of the focal spot. Since heating occurs by absorption there is, for all practical purposes, no delay between heat radiation influx and resulting temperature rise. As the center of the focal spot passes over the spot under consideration, the temperature thereof rises steeply to a peak value 83–2. It shall now be assumed that the intensity has been chosen so that just shortly before the spot reaches the maximum temperature value 83–2, i.e., for example, at a time $t_1$ the Curie point is traversed. As the focused spot recedes from the tape spot under consideration the trailing portion of the focal area, so to speak, continues to some extent to apply radiant energy to the spot but at rapidly decreasing intensity. Thus this additional energy declines so rapidly that very shortly after the center of the focused light spot has passed over the tape spot under consideration, thermal decay, i.e., cooling, takes over and the temperature drops rapidly in accordance with slope 83–3. It is thus assumed that shortly after the passage of the center of the focused spot the heat outflow exceeds the heat inflow. Particularly the temperature will fall soon below the Curie level, for example, at the time $t_2$. Furthermore, in FIG. 6*a*, time $t_3$ marks the instant when the temperature has dropped to a value so that the then existing coercive force is about equal to the amplitude of the magnetic field applied by the transducer 84.

The recording process should now be regarded in some greater detail. For recording proper, a particular magnetization will be imparted to the spot under consideration while the spot reverts from the paramagnetic state to the ferromagnetic state. As we have seen, this does not occur at a particular instant but commences at a temperature somewhat above the Curie point and down to a temperature sufficiently below thereof. Thus, the recording process for the spot requires the period of time $t_2$—$t_3$. Most particularly now, the spot under consideration will receive a definite magnetization only if during this specific period of cooling the magnetic field does not change materially. Thus the magnetic signal effective during the period $t_2$—$t_3$ must not vary, i.e., until the spot has cooled to such an extent that the then existing coercivity is above the amplitude of the magnetic signal as applied. This is the worst case condition. Generally it places a constraint on the permissible signal variations in terms of db. signal change per unit time as it can be processed.

It is evident that a rapid cooling process extends the corresponding signal frequency range which can be recorded satisfactorily, i.e., above a reasonable signal-to-noise ratio. The rate of cooling depends surprisingly little on external means such as additional cooling through a blower. Instead, it is an intrinsic process and, for a given size layer, it depends thus predominantly on the area covered by the radiation beam-layer interaction. This is particularly so as the quantities of thermal energy are rather minute which in turn is accomplished by making the recording layer very thin, so that a unit size area of the tape requires very little thermal energy to be heated above the Curie point. Moreover the thermal process involved are such that an externally induced flow of air, for example, is much too slow to materially influence the thermal decay, except that a blower may provide for a generally cool environment in case the entire recording process is of long duration and thereby tends to raise the environmental temperature.

One of the most important factors for the cooling is the speed of the recording beam. The faster the beam the shorter the time a spot receives thermal energy and thus cannot accumulate excessive amounts of thermal energy. Another, similarly important factor is the degree of focusing so that each point heated by a beam does not receive much thermal energy after the center of the focus beam has passed over it. Thus, any tape spot is to be heated by a pulse of short duration and rapid decay. Speed and the degree of focusing together thus determine how fast a tape spot can cool by dissipating its thermal energy into the environment. Speed and focusing restrict the area of heating so that the center of the track as inscribed has a cool environment all around into which the thermal energy can be dissipated. Thus, a slow heating process would impede a fast decay.

Ultimately of course the thermal decay is determined by the conditions for heat inflow and outflow at any instant: the heat inflow is to be so fast with a rapid decay that the outflow can take over thereafter at a high rate. In other words it is highly desirable to establish and to work with unbalanced conditions; during the period of heating the thermal energy is to be supplied at as fast a rate as possible so that the (always) concurring heat outflow is negligibly small and the heat inflow is a predominant factor. After maximum temperature has been reached, heat inflow is to decay as rapidly as possible so that immediately the opposite imbalance condition occurs, i.e., the heat outflow is to prevail over heat inflow with maximum heat outflow occurring when there is little or practically no heat inflow any more.

One can see, therefore, that the recording process progresses in, so to speak, the wake of the running heating spot where the magnetic dipoles are being aligned in accordance with the concurrently imparted magnetic field during the critical period of thermal decay. The alignment "freezes" after the temperature has dropped to the point where the coercivity exceeds the magnetic field set up by the transducer. The remanent magnetization then existing at the spot will not be altered any more (or not significantly so) if the weaker transducer field changes subsequently. It has been found that this thermal decay period $t_2$—$t_3$ is in the microsecond range so that the fidelity of the recording process reaches the megacycle range.

For recording with a conventional magnetic transducer the recording proper occurs primarily along the trailing pole shoe of the transducer. In the present system, the recording occurs in the wake of the focused beam, and the quality of the recording is enhanced if the beam is focused onto spots where the instantaneous magnetic field from the transducer is rather homogenic. Thus, the spot should be focused along the center of the rather wide gap 85 of the transducer 84. In lieu of the transducer, a pair of coils such as 37 and 38 in FIG. 1 can be used to particularly establish a homogenic field, variable in time in accordance with the information to be recorded.

One can see, therefore, that there is provided an entirely new type of transverse recording on a magnetic tape using a transducer which is basically of the conventional type, but it extends all across the tape. The focused light beam establishes small progressive areas along the transducer, on the tape where recording can actually occur, while outside of that spot at any instant the magnetic field is not effective.

Due to recycling by operation of the mirror wheel, the light beam 92 inscribes parallel tracks upon tape 10 whereby due to the finite width of the focal beam in all directions, including the direction perpendicular to the motion of the beam, there is provided a narrow, heated strip of constant width which is rendered paramagnetic and bounded by two strips resulting from the finite width of the focused spot, and, additionally from lateral spreading of the thermal energy. In these two boundary strips remanence and coercivity is greatly reduced as compared with room temperature remanence and coercivity, and corresponding to the slope of curve 102 shown in FIG. **2*b*. Concurrently thereto the information from the transducer 84** tends to magnetize the carrier wherever the material reverts to the ferromagnetic state and in dependence upon the information then presented by the transducer. The transducer affects all regions where the coercivity is reduced below the amplitude of the ferromagnetic field as applied.

Significantly now the information may be strictly AC in the sense that the magnetic field vector across transducer gap 85 alternates between the direction of tape movement and oppositely thereto. In this case the track inscribed in the wake of the beam will not be a variable width pattern of the type shown and explained with reference to FIG. **1*a* and 1*b***; instead, information will be represented in the form of isolated dots or elongated regions of alternatingly directed magnetization. It can thus be seen that an initial magnetization is not needed here as both directions of magnetization are available for the recording process. The information track is thus not of variable line width against the background magnetization, but the magnetization changes direction along the track.

Branch 115 of the curve shows that the field has little effect on the barrier at low maximum temperatures of heating. Branch 116 shows that almost saturation can be produced if heating is extended into the paramagnetic region. The branch 117 denotes the transition region in the neighborhood of the Curie point. Branch 118 is added here only for reasons of completion of the description and is dynamic in nature. It shows that if the heating results in rather high maximum temperatures, the tape will have moved out of the area controlled by the transducer 84 so that the tape has to cool below the Curie point without the influence of the magnetizing field. Branch 116 can be made to cover a sufficiently high range of temperatures if the transducer has a very wide gap, and if the tape does not move too fast.

Proceeding now to the description of FIG. 7, there is shown a unit operating on thermomagnetic principles with radiation recording, radiation readout and constituting a static type memory device. The unit can be used for example as scanconverter for an electrical signal representing video signals of a particular format and convertible into a different format. A cathode-ray tube 120 is constructed in general in a manner as it is known, and it is thus provided with an electron gun portion 121 having a signal input 122 and a control input 123 to provide a line-for-line scanning over a two-dimensional field or area. The front of this tube 20 is closed by the base surface of a prism 135. This base surface bears several layers which, considered from the interior of the CR tube 120, are as follows:

Facing the gun, i.e., the electron beam in tube 120 is a layer 130 having thermomagnetic properties, in that it has a low Curie point, and comprising, for example, $CrO_2$. This layer 130 is rather thin, and it offers a plane surface to the electron beam from the gun portion 121. As was stated above, the principal objective is the concentrated transformation of the energy of an electron beam into thermal energy. The electron-lattice interaction leads, to a substantial degree, directly to an increase in the thermal energy of chromium dioxide.

A very thin film 136 of ferromagnetic material is sandwiched between the chromium dioxide layer 130 and the base proper of the prism 135. This very thin ferromagnetic layer may have a thickness of a few hundred Angstroms and is provided here as a means permitting highly specular reflections of light which is directed in the prism towards its base.

A pair of coils 131 is provided to magnetize the chromium dioxide layer 130. These coils will also cause erasing of any previously inscribed image or stored information content if one uses a field $H_s$ as was defined above. The information to be stored in this layer or plate 130 can be digital or analog or mixed. It can be identified by individual storage cells, or it can be a more or less continuous image with as fine a resolution as can possibly be produced by the flying spot type scanning operation. Upon turning on a DC current to flow in a particular direction in the coils 121, the chromium dioxide layer 130 is magnetized as a whole, and if the current is strong enough, uniform saturation is attained throughout layer 130, the producing field being, for example, $+H_s$ as shown in FIG. *2a*. For recording proper, the current flow in coils 121 is reversed, but only a weak field, such as $-H_1$ (FIG. *2a*) is set up, which is insufficient at low temperatures to destroy the remanent magnetization as produced originally.

There may be provided some thermal bias to the entire assembly, but of course, the overall increase in the content of thermal energy in layer 130 in case of recording must not be capable of destroying and reversing the magnetization throughout the entire layer indiscriminately.

The resolution, i.e., the storage capacity of the tube, will here depend upon a rather steep drop of the thermoremanent magnetization near the Curie point, and on a corresponding rapid change of the hysteresis loop for small temperature variations. An area hit by an electron beam will reverse its magnetization as aforedescribed. Subsequently occurring lateral heat flow into the environment spreads the affected area to some extent, but there is also a flow of thermal energy into the prism through its base, which reduces the amount of thermal energy that may spread laterally. Only a small temperature drop resulting from this heat transfer into the prism suffices to cause reversion to the ferromagnetic state and expansion of the hysteresis loop. The effect of the weak magnetic field drops rather suddenly in all directions from the area of layer 130 which was intercepted by the radiation beam so that the area permanently affected by magnetization reversal remains small around the particular area which was actually hit directly by a high intensity recording beam. The recorded information is thus not "smeared" over too large an area. The envelope of the cathode-ray tube may be provided with a portion 150 having a window 151 through which is directed light from a controlled light source 152 for purposes of adding, substituting or supplementing information in form of radiant energy.

Subsequent to recording, the weak magnetic field set up by the coils 131 decays and any magnetization in the film then present will result exclusively from the permanent magnetization of layer 130. For readout, a collimated light beam 139 is directed through a polarizer 138 which provides linear polarization of the light beam 139. The light is reflected by and in the layer 135, having incrementwise attained the same magnetic state as the respective juxtaposed increment of the layer 130.

The principle of reversibility explored above applies also to this embodiment. The electron beam in the cathode-ray tube 120 may always have a constant intensity in which case the information signal is not applied as modulation to the electron gun 121, but, instead, the information signal is applied to the magnetizing coils 131, always at low coercivity strength. The magnetization will affect only the portion on the screen intercepting the electron beam so that the coercivity of that particular spot is sufficiently low to receive the information now in the form of magnetization. These spots may be organized along a scanning line, even cover a larger, line-scanned area of the screen 130, any incremental portion thereof, or even only a single "storage cell" having dimensions of the focused spot itself. One can see in this case that for such method of control it will be impossible to distinguish between an initial magnetization and a substitute magnetization, as any magnetization imparted upon this layer or screen occurs only at a point of interception of the thermomagnetic screen with an electron beam. The magnetization then imparted upon the screen as a whole is effective only at the intercepted spot and is always meaningful magnetization as it may have either of two opposite directions. Depending upon the direction of the magnetization of an area increment upon which a ray impinges, its plane of polarization is rotated in one or the other direction. The analyzer 141 converts the areawise differing direction of the plane of polarization of the reflected beam into an area contrast modulation.

A viewing device such as a vidicon tube 140 observes the reflection at the base of prism 135 through the analyzer 141. The scanner tube 140 thus provides an electrical signal indicative of the readout process. To the extent that the flying spot in either vidicon tube 140 or in the recording tube 120 can be driven towards a single spot directly, this device can be used as a random access type memory. It should be noticed here that unlike conventional processes of recording and reading, the recording process does not disturb a concurrent readout process. If the coercivity of film 136 is still larger than the weak reversing field or when no weak reversing field is provided for, then an area of layer 130 onto which a signal is just being written, can be observed at the same instant as to the correctness of the recording. The thermal erasure of magnetization in an area increment juxtaposed to layer 130 may be observed as it immediately affects the state of magnetization of film 136 at that area. Thus, the production of the recording itself can be observed optically. This requires merely a synchronization of the tubes 120 and 140. Thus, the scanners in either tube can be operated from the same control.

Erasing of the entire recording is possible either by scanning over the entire plate 120 with a high-powered electronic beam, or by applying a large magnetizing current to the coils 121 or both. Selective erasing is possible by heating the areas to be erased uniformly, and applying a magnetic field $+H_1$ to the layer, having substantially the same result as a $+H_s$ field at lower temperatures. This possibility includes the case of changing the stored information content in one particular spot; or in a limited area only.

It can be readily seen that the structural combination of recording and reading does not depend on the utilization of an electron beam for recording, but instead a focused light beam can be used to inscribe heating tracks on one side of a thermomagnetic storage carrier. The magnetization can then be read from the other side magneto optically as described. This structure is inherently included in the embodiments as described. One may, for example, substitute the CRT envelope in FIG. 7 by the controlled light source and rotating mirror as shown in FIG. 5 with the added provision of moving the light beam additionally corresponding to the tape motion (arrow 81). It is also conceivable to move the prism 135 with magnetic layers attached so that the motion of the light beam in one direction is supplemented by a motion of the record carrier in the orthogonal direction just as in case of recording on a tape.

The invention is not limited to the embodiments described above but all changes and modifications thereof not constituting departures from the spirit and scope of the invention are intended to be covered by the following claims.

We claim:

1. A transducing system using a magnetizable storage carrier having temperature dependent coercivity and having properties of becoming paramagnetic when subjected to heat beyond a particular temperature and having remanence properties of retaining increasing amounts of magnetization upon becoming subsequently cooled below the particular temperature, comprising:

first means for providing, as an output, radiant energy to the carrier to heat instantaneously particular areas of the carrier so that coercivity and remanence in any of the particular areas when heated at any instant respectively differs from the coercivity and remanence in areas juxtaposed to the particular area;

second means for providing a movement of the carrier in a longitudinal direction, said first means providing a beam of concentrated radiant energy in a lateral direction transverse to the longitudinal direction to obtain an inscription of information in a plurality of parallel tracks defining said particular areas;

third means for providing to the carrier, as an output, magnetization having characteristics to obtain in the particular areas a magnetization, after exposure of the carrier to the first and third means, different from the remaining magnetization in the respective juxtaposed areas, said third means being operative to produce first flux in a first direction on the carrier colinear with said longitudinal direction, and including fourth means for magnetizing the carrier with saturating flux, prior to the application of the radiant energy by the first means to the carrier, in a second direction opposite to the first direction; and fifth means for providing to one of the first and third means, for controlling the intensity of the respective outputs thereof, information signals having variable characteristics representative of information to be recorded.

2. A system as set forth in claim 1, including in addition means for heating the carrier uniformly to a temperature below the particular temperature to provide thermal bias.

3. A transducer and storage system comprising:

a first, flat magnetizable storage carrier having temperature dependent coercivity, and relatively high room temperature coercivity;

a second, flat magnetizable layer in surface-to-surface contact with the first carrier and having relatively low room temperature coercivity and relatively high remanence;

first means including a cathode-ray tube, having said first flat carrier as screen and including an electron gun, the second carrier facing away from the electron gun for providing radiant energy to said carrier to impart, upon particular areas of said carrier, predetermined quantities of thermal energy for reducing the coercivity in said particular areas;

second means for providing to the carrier magnetization and including means for selectively providing a magnetic field in a first direction in the first carrier at a field strength in excess of room temperature coercivity, and in a second direction opposite to the first direction in the first carrier at field strength below room temperature coercivity so that the magnetization in the particular areas, after exposure to the radiation, has direction different from the direction of magnetization in areas juxtaposed to the particular areas;

third means for controlling the operation of individual ones of the first and second means in accordance with the information to be stored to control the intensity of the radiant energy from the first means or the magnetization from the second means;

a prism having its base disposed on the second carrier;

fourth means for directing a beam of polarized light toward the prism base for obtaining total reflection in the interface of prism base and second carrier to obtain a change in the polarization of light in accordance with the interaction of the polarized light with magnetic field provided by the magnetization of the carrier; and analyzing means disposed in the path of light as reflected by the prism base to be responsive to the rotations in the polarized light for converting said changes in the polarized light into an illumination contrast.

4. A scan converter using a medium for temporary storage, the medium having a relatively low Curie point and temperature dependent remanence and coercivity and having properties of becoming paramagnetic when subjected to heat beyond a particular temperature and having remanence properties of retaining increasing amounts of magnetization upon becoming subsequently cooled below the particular temperature, comprising:

means for providing a relatively strong uniform magnetization to the medium, to magnetize the medium at saturation in a first direction;

first means for directing a beam of radiant energy towards said medium for absorption therein, said first means including means for providing relative displacement between said beam and said medium in a lateral direction and including means for providing relative movement between the medium and the beam in a longitudinal direction transverse to the lateral direction to inscribe a sequence of parallel tracks on the medium transverse to said direction of magnetization;

second means for modulating the intensity of the beam in accordance with an input signal to provide a variable width of said tracks and having sharply delineated boundaries within which the carrier has particularly reduced coercivity, the width varying in accordance with such modulations;

third means for magnetizing the medium to provide a magnetization of the medium within the boundaries of the tracks having direction opposite to the remaining magnetization of the medium in the first direction and between the tracks;

fourth means for directing a collimated beam of linearly polarized light toward said medium;

a prism having a base disposed in relation to the medium, so that upon total reflection of the polarized beam, on the base the beams interact with the differently directed magnetic field respectively provided by the magnetized medium in and in between the tracks to provide differently oriented rotation of the polarized light in accordance with such interaction;

analyzing means for receiving said reflected beam and producing an illumination field having contrasts at different positions in the tracks in accordance with the rotation of the polarized light; and fifth means for scanning said illuminating field to produce an output signal in accordance with the contrasts in the illumination at the different positions.

5. A device for recording information presented as an electrical signal train, on a thin, flat storage carrier which is ferromagnetic at room temperature and paramagnetic at a temperature above a particular temperature defining the Curie point of the carrier, the carrier, furthermore, having temperature dependent coercivity, comprising:

first means for providing a particular uniform, saturation magnetization in the carrier, the magnetization having a first direction in the carrier;

second means providing a concentrated beam of radiant energy upon the carrier to obtain local heating of the carrier at a relative peak temperature in the center of interaction between beam and carrier, and a downwardly sloping temperature distribution around the center;

third means, operative connected to the second means for providing relative motion between the beam and the carrier, so that the spot of beam-carrier interaction moves across the surface of the carrier in a direction transverse to the direction of uniform magnetization, thereby inscribing a heating track across the surface of the carrier, the track having width defined by portions of the carrier heated above a temperature below but close to the Curie point;

fourth means providing a magnetic field at strength below room temperature coercivity to the carrier, to be effective particularly in regions across which the beam has passed, wherein the temperature decreases again, and wherein the coercivity has been reduced below the strength of the field as provided by the fourth means, the magnetic field as provided by the fourth means having direction to magnetize the carrier in direction opposite to the direction of magnetization as provided by the first means, so that boundaries are established along the track, along each side boundary magnetizations of adjacent carrier portions are oppositely directed across the boundary; and fifth means connected to the second means to control the intensity of the beam, for controlling the width of the track in which the remanent magnetization is determined and effected by the fourth means in representation of information to be recorded.

6. A device as in claim 5, including sixth means for uniformly heating the carrier to a temperature well below said particular temperature, without substantially affecting the magnetization in the carrier as provided by the first means, the sixth means disposed so that the portion of the carrier interacting with the beam has temperature above room temperature.

7. A transducing system as set forth in claim 5, comprising:

means (a) for directing a beam of collimated linear polarized light towards said carrier for interaction with the spatially variable magnetization recorded on the carrier; and means (b) responsive to a variable degree of rotation of the polarized light resulting from interaction of the spatially variable magnetization of said carrier with the polarized light to indicate at each instant the spatially variable magnetization recorded on the carrier.

8. A device for recording information presented as an electrical signal train, on a thin, flat storage carrier which is ferromagnetic at room temperature and paramagnetic at a temperature above a particular temperature defining the Curie point of the carrier, the carrier, furthermore, having temperature dependent coercivity, comprising:

first means for providing a particular uniform, saturation magnetization in the carrier, the magnetization having a first direction in the carrier;

second means providing a concentrated beam of radiant energy upon the carrier to obtain local heating of the carrier at a relative peak temperature in the center of interaction between beam and carrier, and a downwardly sloping temperature distribution around the center;

third means, operative connected to the second means for providing relative motion between the beam and the carrier, so that the spot of beam-carrier interaction moves across the surface of the carrier in a direction transverse to the direction of uniform magnetization, thereby inscribing a heating track across the surface of the carrier, the track having width defined by portions of the carrier heated above a temperature below but close to the Curie point;

fourth means providing a magnetic field at strength below room temperature coercivity to the carrier, to be effective particularly in regions across which the beam has passed, wherein the temperature decreases again, and wherein the coercivity has been reduced below the strength of the field as provided by the fourth means, the magnetic field as provided by the fourth means having direction to magnetize the carrier in direction opposite to the direction of magnetization as provided by the first means, so that boundaries are established along the track, along each side boundary magnetizations of adjacent carrier portions are oppositely directed across the boundary; and means connected to the fourth means to control the strength of the magnetic field as provided by the fourth means, in accordance with the information to be recorded, thereby varying the width of the track, the intensity of the beam as provided by the second means being constant.